United States Patent [19]

Ginatta

[11] 4,451,340

[45] May 29, 1984

[54] METHOD FOR THE ELECTROLYTIC PRODUCTION OF LEAD

[75] Inventor: Marco V. Ginatta, Turin, Italy

[73] Assignee: Elettrochimica Marco Ginatta SpA, Turin, Italy

[21] Appl. No.: 498,425

[22] Filed: May 26, 1983

[30] Foreign Application Priority Data

Jun. 4, 1982 [IT] Italy .................................. 67723 A/82

[51] Int. Cl.³ .............................................. C25C 1/18
[52] U.S. Cl. .................................. 204/117; 204/114; 204/294
[58] Field of Search ........................ 204/114, 117, 294

[56] References Cited

U.S. PATENT DOCUMENTS 4,229,271 10/1980 Prengaman .......................... 204/114
4,230,545 10/1980 Prengaman et al. ................. 204/114

Primary Examiner—R. L. Andrews
Attorney, Agent, or Firm—Edwin E. Greigg

[57] ABSTRACT

Method for the production of electrolytic lead from lead containing solutions resulting from both primary extraction processes and scrap processing operations, consisting in the use of insoluble anodes made of uncoated graphite for oxygen evolution, together with noncontinuous cathodes for the production of lead, with the presence of additives in the electrolyte.

20 Claims, 1 Drawing Figure

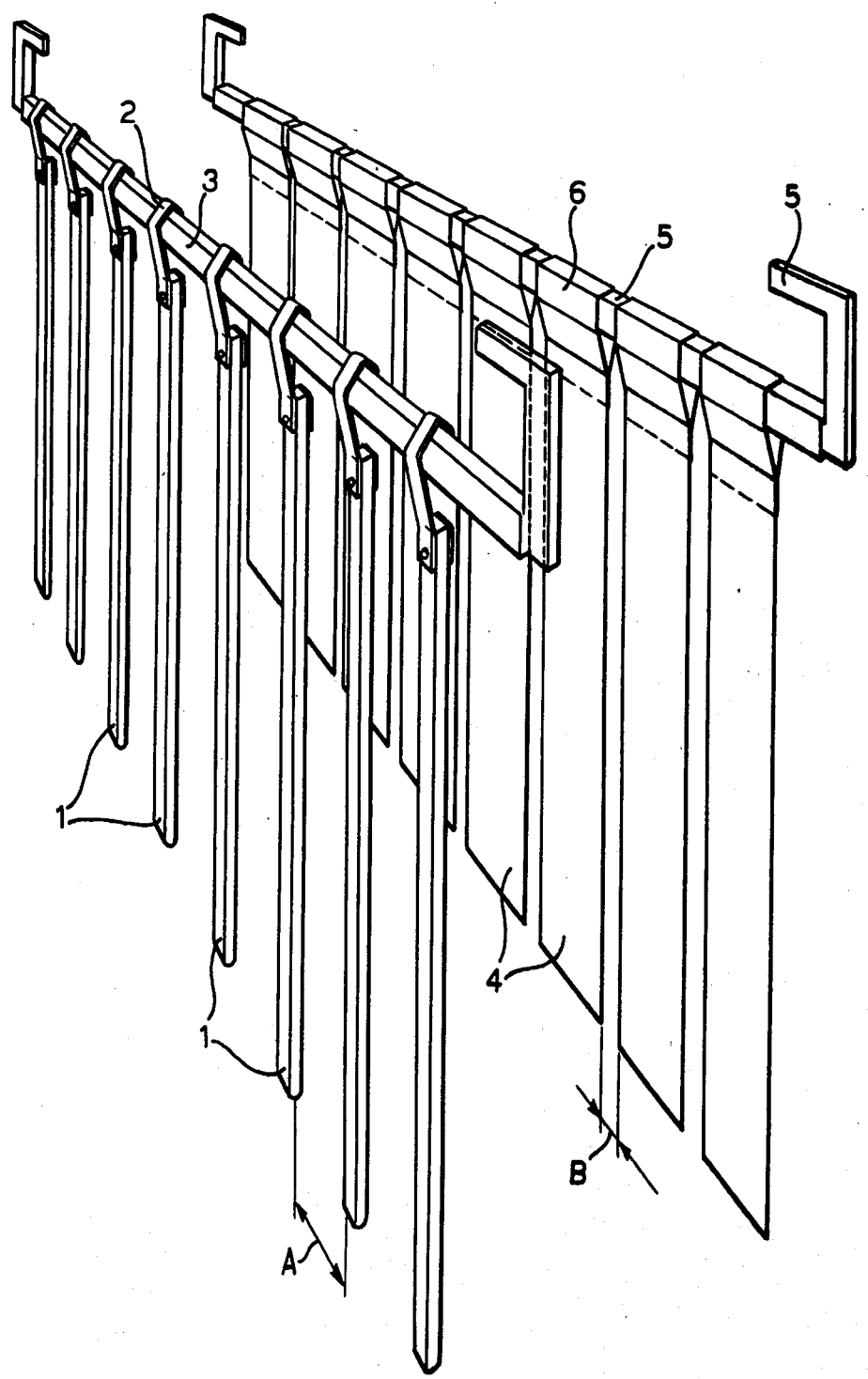

METHOD FOR THE ELECTROLYTIC PRODUCTION OF LEAD

BACKGROUND OF THE INVENTION

With the appearance of new electrochemical plants for the production of non-ferrous metals, which plants are taking the place of obsolete and polluting pyrometallurgical plants, a need is felt for improving the operative procedures of the tank houses for lead containing solutions resulting from both primary extraction processes and scrap processing operations.

Currently, for the production of electrolytic lead, the insoluble anodes for the evolution of oxygen that proven to have the best cost/duration ratio are the ones that use graphite as a substratum with a coating of lead dioxide. However, their manufacturing cost remains high.

Recently in the electrolytic production of lead it is becoming quite common to use very large cathodes circa 2,000×2,000 mm, together with very large insoluble anodes. There are no important technical reasons that would prevent the use of even larger anodes and cathodes, resulting in higher cells productivity and simpler tank house automation.

The increasing popularity of maintenance-free batteries requiring low antimony lead alloys, coupled with the need to avoid refining by means of pyrometallurgical operations, has created the need for directly producing in one step antimony free cathodes.

Until now in the manufacturing of insoluble anodes, the operation of first coating the graphite with lead dioxide from nitrate could not be avoided, since the life of non-coated graphite under the traditional process conditions is very short, being no more than 15 days. This is due to the attack of the fluorine ions of the electrolyte on the bonding materials present in the graphite; the nascent oxygen forming in the cracks of the graphite causing it to break into pieces.

OBJECTS AND DETAILED DISCUSSION OF THE INVENTION

An object of this invention is a cobalt containing electrolyte, preferably associated with antimony, and process conditions allowing uncoated graphite, that is not previously coated with lead dioxide, to be used for the evolution of gaseous oxygen, with minimal graphite consumption. This avoids the coating operation, resulting in lower manufacturing costs for the anodes.

Another object of this invention are configurations allowing for the best utilization of the graphite, presently being an expensive material, with the best distribution of current lines between anodes and cathodes.

Another object of this invention is a cathode made of independent strips that allows the maintaining of the benefit of very large cathodes, while the handling and transportion of the individual strips is much easier. Further, the manufacturing cost of the starting sheets needed for such cathodes is a fraction of the cost for manufacturing starting sheet 2,000 mm wide. A small rolling mill having a small water cooled cylinder acting on molten lead is sufficient for producing the strips and less expensive to operate than a rolling mill capable of producing strips having a 2,000 mm width.

Another object of this invention is to provide operative conditions at which, even at a low concentration of lead in the solution, good quality cathodic deposition is obtained; this being due to the free circulation of the electrolyte, such as is possible with the strip cathodes in strips and the bar anodes.

Another object of this invention is to provide an electrolyte in which in addition to or instead, of the animal glue commonly used for obtaining a flat cathodic deposition, Triton X-100 polymer and Phenolphtalein are used, separately or in a mixture, with the purpose of permitting the dissolution process to be operated at high current density.

Another object of this invention is to provide a set of operative conditions at which the antimony concentration in the electrolyte is maintained within an optimal range by means of selective adsorption on carbon containing material.

Another object of this invention is to provide a set of operative conditions at which the antimony present in the electrolyte is oxydized and then maintained in a state of pentavalent oxidation. This is obtained by oxidation with lead dioxide, or by means of anodic oxidation with electrodes fed with alternated or periodically reversed current. This mode of operation contributes to the preservation of the anodes.

Another object of this invention is the direct production of cathodes in the form of pure strips, requiring no further cutting operations, or further refining operations, nor melting in ingots. In fact, cathodes with no entrapped electrolyte are obtained at the indicated operative conditions. Such cathodes can be melted by the end user without any gaseous emissions. One melting operation is then avoided, with the cost and pollution that go with it.

The strips of the cathodes are also suitable to be directly fed in rolling mills for the production of lead coil used in the manufacturing of continuous battery grids according to the latest technologies.

Another advantage in using starting sheets made of individual strips is that the problems created by the structural weakness of lead are overcome. The process of cold cutting the edges for trimming the size, strengthens the edges in such a way that they are easily and precisely positioned in the tanks, allowing for a very small interdistance between anodes and cathodes.

A further advantage in using such cathodes is that the "edge effect" during cathodic deposition is less pronounced, since the edges protect each other from excessive current concentration. The external edges have much less current concentration than edges in whole cathodes.

In an industrial plant for the production of lead from spent batteries, no changes were registered in the dissolution mechanism of batteries nor in the performance of the anodes during and after the switch of electrolyte additives from animal glue only to Triton and Phenolphtalein. Spent batteries, during the first hours of dissolution, can allow for much higher current passage than what is permitted by the cathodes, while anodes perform all the better with higher current density. With the electrolyte embodying this invention, the productivity of each tank was doubled. A cathodic current density of over 400 A/$M^2$ was reached as compared of 180 A/$M^2$ allowed by the use of animal gelatin.

For the sole purpose of illustrating the invention, the following conditions for an aqueous electrolyte containing acid in which lead is soluble, are given as an example:

| | | |
|---|---|---|
| Pb concentration | from 5 | to 1,200 g/l |
| Free acid | from 0 | to 800 g/l |
| Levelling compound | from 0 | to 20 g/l |
| Oxygen overvoltage reducing ions | from 0.001 | to 10 g/l |
| Density | from 1.05 | to 2.6 kg/l |
| Temperature With or without agitation | from 8 | to 115 C. |
| Cathodic current density | from 10 | to 500 A/m$^2$ |
| Anodic current density | from 10 | to 1100 A/m$^2$ |
| Cell voltage | from 1.5 | to 4.6 V |
| Graphite density | from 1.2 | to 2.6 g/cm$^3$ |
| Iron oxide in graphite | from 0.0 | to 15% |

The geometric configuration of cathodes and anodes can be of any type since there are no practical limitations.

For the sole purpose of illustrating the invention, the following are operative conditions for hydrofluoroboric acid aqueous electrolytes:

| | |
|---|---|
| HBF$_4$ | 220 g/l |
| Pb content | 25 g/l |
| H$_3$BO$_3$ buffer | 30 g/l |
| Co in solution | 200 ppm |
| Sb in solution | from 250 to 1,000 ppm |
| Levelling gelatin | 0.2 g/l |
| Temperature | 30° C. |
| Cathodic current density | 180 A/m$^2$ |
| Anodic current density | 400 A/m$^2$ |
| Voltage | 2.6 V |
| Pb cathodes title | 99.995% |

For the sole purpose of illustrating the invention, the following are operative conditions for the production of lead from spent batteries:

| | |
|---|---|
| HBF$_4$ | 200 g/l |
| Combined Pb | 40 g/l |
| H$_3$BO$_3$ | 30 g/l |
| Co in solution | 200 ppm |
| Sb in solution | 2,000 ppm |
| Triton X-100 (C$_8$H$_{17}$—(C$_6$H$_4$)—(OCH$_2$)$_{9-10}$OH) | 0.2 |
| Phenolphtalein | 0.1 g/l |
| Temperature | 40° C. |
| Cathodic current density | 400 A/m$^2$ |
| Anodic current density | 800 A/m$^2$ |
| Cell voltage | 2.7 V |
| Pb cathodes title | 99,99% |

Other electrolytes for which the above operative conditions are suitable are, for example, those based on fluosilicic acid, sulphamic acid, acetic acid, nitric acid, and generally the ones in which lead is soluble.

BRIEF DESCRIPTION OF THE DRAWING

In the drawing FIGURE a possible configuration of anodes and cathodes, according to the invention, is shown.

DETAILED DESCRIPTION OF THE INVENTION

The anodes consist of graphite bars 1 of square section 33×33 mm, preferably with rounded corners, 1,850 mm long, individually hung at 200 mm intervals A by means of copper hooks 2 to a copper bar 3. The bars 1, preferably eight, in number, form one insoluble anode.

The quality of the graphite used is:

| | |
|---|---|
| Density | 1.75 g/cm$^3$ |
| Porosity | 19.6% |
| Iron oxides contained | 0.7% |
| Electric resistivity with the grain | 8.6 microhm/m |

The preferred cathodes configuration consists of lead strips 4 of lead sheet 2 mm thick, 200 mm wide and 2,000 mm long for the immersed part. These are individually hung by doubling 6 around the cathodic bar 5 and welded on itself; distance between strips B, for a new starting sheet, is 50 mm.

For best operating performance, it is useful that the immersed cathodic surface be at least the double of the anodic one. The use of such cathodes, together with the bar anodes described above, allows for a regular current distribution such as to be able to function well without corner protecting frames.

Cobalt does not need periodic additions since it does not deposit on the cathode, neither does it influence the purity of the lead produced.

Anodes, which are previously coated with lead dioxide and then used in the electrolyte described above, are integral part of this invention.

For the production of high quality cathodes, it is useful to bleed a part of the electrolyte through a column containing graphite powder, so as to keep antimony at the lower limit of 250 ppm.

The selective adsorption of antimony is very effective. The desorption from the graphite is obtained by running a countercurrent through a 40% solution of hydrofluoric acid, and then repeating the operative cycle.

During the operation of plants for the production of electrolytic lead from spent batteries, most of the antimony remains in the residual slimes inside the battery cases. A part of the antimony that dissolves in the electrolyte could come from the grids of traditional batteries due to the oxidation of antimony metal to trivalent ion, while another part could come from the active material to which antimony is added by the manufacturers in quantities as high as 2,000 ppm, especially in the maintenance-free types. This antimony is already in oxidized form, partly trivalent and partly pentavalent. It is well known that the trivalent form codeposits with the lead on the cathode.

One of the features of this invention is the finding that the pentavalent oxidized antimony does not reduce on the cathode, therefore does not decrease the lead purity.

One of the objects of this invention is the method for fostering the oxidation of antimony from trivalent to pentavalent. The pentavalent has a solubility limit, depending upon the operative conditions, of about 3,000 ppm. Above this value is precipitates.

Excellent results were obtained by oxidizing the trivalent antimony with lead dioxide. In practice this is obtained by running the process electrolyte through a bed of lead dioxide powder.

Another method, especially useful for plants producing electrolytic lead from spent batteries, and that gives excellent results, consists in lining the bottom of the dissolution tanks with ground lead dioxide. The heavy electrolyte descending from the frames, of the dissolving batteries enters in contact with the lead dioxide therefore allowing the oxidation of the antimony from trivalent to pentavalent. The same results are obtainable by disposing several baskets, containing ground lead dioxide, in various points of each dissolving tank, such as along the walls, between the electrodes and so on.

It is also useful to have the electrolyte circulation in such a way that the solution coming from the dissolution tanks would immediately contact the anodes, on which the trivalent antimony is oxidated to pentavalent.

The purity of the cathodes is further increased by electrochemical oxidation of the antimony from trivalent to pentavalent.

Another object of this invention is the electrochemical purification of the electrolyte by oxidation of the antimony to pentavalent with the use of anodes, preferably coated with lead dioxide, to which electric current, alternated or periodically reversed, is applied. The purification is obtained, during the positive polarity period of time the oxidation of the antimony from trivalent to pentavalent occurs, while during the negative polarity period of time the reduction of the lead dioxide occurs. It can also be useful to have a dead period in the cycle between positive and negative polarity.

If it is desired to obtain cathodes in the form of blocks of small size, it is sufficient to shield lines on the starting sheets so to prevent lead deposition on those areas, obtaining therefore lines of easy separation in the mature cathodes.

As an example it is sufficient to apply rubber bands around the above mentioned strips, at the chosen distance one from the other, so to obtain easily separable sections of cathodes.

What is claimed and desired to be secured by Letters Patent of the United States is:

1. A method for the production of electrolytic lead from solutions containing lead resulting from both primary extraction processes and scrap processing operations, comprising: electrolyzing the solution between insoluble anodes made of uncoated graphite for oxygen evolution and noncontinuous cathodes for the production of lead in the presence of cobalt in an electrolyte.

2. The method according to claim 1 in which: the cathode means are in the shape of bars and the graphite anodes are in the shape of strips.

3. The method according to claim 1, in which: the electrolyte is principally an hydrofluoboric acid containing said cobalt in solution.

4. The method according to claim 1, in which: said electrolyte also contains antimony.

5. The method according to claim 4, in which: the concentration of antimony in said electrolyte is between 200 and 1000 ppm.

6. The method according to claim 3, in which: the concentration of cobalt present in said solution is at least 5 ppm.

7. The method according to claim 5, in which: the concentration of cobalt present in said solution is at least 5 ppm.

8. The method according to claim 1, in which: to obtain a flat cathodic deposition of lead, the electrolyte contains Triton X-100 and Phenolphtalein in concentration between 0.001 and 10 g/l.

9. The method according to claim 1, in which: the electrolyte is principally an hydrofluosilicic acid solution.

10. The method according to claim 1, in which: the electrolyte is principally a sulphamic acid solution.

11. The method according to claim 1, in which: the ratio between the cathodic surface and anodic surface is more than unity.

12. The method according to claim 5, in which: the graphite anodes have a lead dioxide coating thereon effective to oxidize and maintain in a state of pentavalent oxidation the antimony present in the electrolyte.

13. The method according to claim 5, in which: the antimony present in the electrolyte is oxidized to a state of pentavalent oxidation by means of anodic oxidation with electrodes fed with periodically reversed current.

14. A cell for the production of electrolytic lead comprising lead cathodes for the lead deposition and graphite anodes for the oxygen evolution, and an aqueous acid electrolyte containing lead, characterized in that the anodes are made of uncoated graphite and said electrolyte contains cobalt, the presence of said cobalt in the electrolyte preventing the anodic dissolution of said uncoated graphite anodes.

15. A cell as described in claim 14, characterized in that the concentration of cobalt in the electrolyte is at least 5 ppm.

16. A cell as described in claim 14, characterized in that the electrolyte contains also antimony.

17. A cell as described in claim 16, in that the concentration of antimony in the electrolyte is maintained between 200 and 1,000 ppm.

18. A cell as described in claim 17, characterized in that the concentration of antimony in the electrolyte is maintained within the range indicated by bleeding a part of the electrolyte through a carbon containing material for adsorption by the carbon therein.

19. A cell as described in claim 18, characterized by the fact that the acid in the electrolyte is chosen from a group consisting of hydrofluoboric, hydrofluosilicic and sulphamic acids.

20. A cell as described in claim 14, characterized in that said graphite anodes are in the shape of bars and said cathodes are in the shape of strips.

* * * * *